Patented Dec. 5, 1939

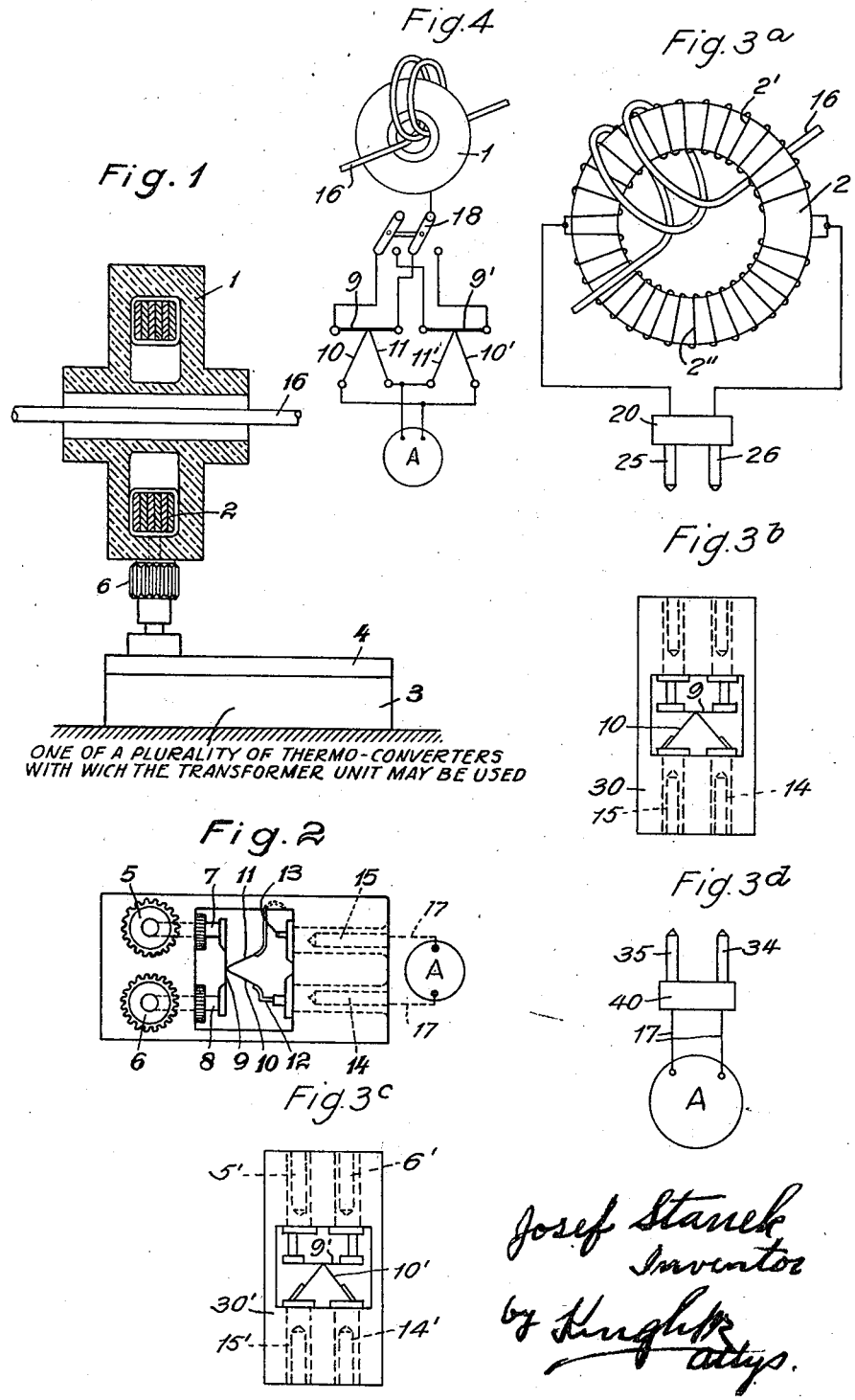
Dec. 5, 1939. J. STANEK 2,182,324
DEVICE FOR MEASURING HIGH FREQUENCY CURRENTS
Filed July 24, 1937

2,182,324

UNITED STATES PATENT OFFICE 2,182,324

DEVICE FOR MEASURING HIGH-FREQUENCY CURRENTS

Josef Stanek, Berlin-Siemensstadt, Germany, assignor to Siemens & Halske, Aktiengesellschaft, Siemensstadt, near Berlin, Germany, a corporation of Germany Application July 24, 1937, Serial No. 155,557
In Germany August 6, 1936

5 Claims. (Cl. 171—95)

My invention relates to a device for measuring high-frequency currents with the aid of a transformer and thermo-converters capable of being alternately connected.

For measuring high-frequency currents, as a rule, thermo-converters are employed, the thermo-couple of which is connected with a direct-current measuring instrument, while the high-frequency current to be measured or a current proportional thereto is supplied to the heating wire. For providing various measuring ranges, a corresponding number of thermo-converters have, as a rule, been hitherto employed. This arrangement has the drawback that the scale law varies when for taking measurements in different measuring ranges a thermo-converter is replaced by another one. The direct-current measuring instrument, therefore, should be provided with a number of different scale divisions corresponding to the number of measuring ranges unless a special calculation is to be made each time. A measuring instrument thus provided with different scale marks may be satisfactory as long as only two measuring ranges are to be employed. However, such an arrangement becomes the less satisfactory, the greater the number of measuring ranges.

According to the invention, this drawback is removed by employing also in the case of a considerable number of measuring ranges only two thermo-converters for two different current intensities in connection with a transformer whose secondary circuit is designed to be connected at will to one or the other thermo-converter. In this manner it is possble to increase the number of the measuring ranges by selectively connecting the thermo-converters directly or through the transformer to the high-frequency current to be measured. Besides the four measuring ranges thus obtained, others may be obtained by winding the conductor carrying the high-frequency current once, twice or more times around the core of the transformer.

The transformer is preferably designed in the form of a circular core transformer and is placed in an insulating case which is provided with a detachable pin-plug socket for selectively connecting the transformer to either thermo-converter, the converters being arranged in insulating cases which are provided at both sides with plug connections, preferably of non-interchangeable type.

An embodiment of my invention is shown in the accompanying drawing in which

Fig. 1 shows a radial section through the transformer, and a side elevation of one of the thermo-couple devices connected with the transformer, Fig. 2 shows a top view or the thermo-couple device of Fig. 1, the transformer and the cover of the thermo-couple casing being removed, Figs. 3a, 3b, 3c and 3d represent a second embodiment comprising a transformer similar to that of Fig. 1, two thermo-couples, and a measuring instrument, and Fig. 4 illustrates in a diagrammatic form a third embodiment.

Referring at first to Figs. 1 and 2, the novel device consists of a transformer having an annular core 2 and an insulating case 1, and of two thermo-converters, one of which only is shown and is placed in an insulating case 3. The secondary winding surrounding the annular core 2 consists of two parts, each covering one half of the core and connected in parallel relation to each other. This is apparent from the transformer shown in Fig. 3a, whose annular core 2 is identical with core 2 in Fig. 1, and carries two parallel-connected secondary part-windings 2' and 2''. In this manner the beginning and the end of the secondary circuit are spaced a distance equal to the diameter of the ring core and, consequently, the displacement currents are small. Returning to Fig. 1, the insulating case 1 enclosing the core with its secondary winding is relatively thick-walled in order to attain between the primary and secondary parts as great a distance as possible.

The case 3 is provided at one end thereof with two sockets 5 and 6, while the case 1 of the transformer, carries two contact pins which are connected to the ends of the secondary winding and fit into the sockets 5 and 6 so as to establish a detachable coupling. The sockets 5 and 6 are connected with bolts 7, 8 between the ends of which is stretched a short heating wire 9. To this wire 9 are soldered two thermo-couple wires 10, 11 which in turn are connected by supply leads 12, 13 with contact sleeves 14, 15 which are secured in the case 3 and serve to connect a direct-current instrument A by means of flexible conductors 17.

The distance between the terminals 5, 6 is different from that between the contact sleeves 14, 15 in order to avoid false connections. The second thermo-converter cooperating with the device is designed in the same manner, the heating wire being rated for another intensity of current.

If, for instance, measuring ranges of 0.25; 1; 2.5; 5; 10 and 20 amperes are employed, the two thermo-converters will preferably be rated for 0.25 and 1 ampere so that the converters may be employed without the transformer for these two measuring ranges. The high-frequency current to be measured is then directly connected to the terminals 5 and 6. If the secondary winding of the transformer has 20 turns a measuring range of 5 amperes is obtained when using the thermo-converter rated for 0.25 ampere if the high-frequency conductor 16 as shown in Fig. 1 passes directly through the opening of the core 2. In this case the ratio of transformation of the transformer amounts to 1:20. For a measuring range of 2.5 amperes the high-frequency conductor 16 must be wound twice around the core as shown in Figs. 3a and 4 in order to attain a ratio of transformation of 2:20=1:10. Similarly, the measuring ranges of 20 and 10 amperes are obtained with the aid of the thermo-converter rated for 1 ampere. Further measuring ranges may be obtained, if desired, by winding the high-frequency conductor several times around the circular core or by employing more than two differently rated thermo-converters. In order to pass the high-frequency conductor once or several times through the core, a temporary interruption of the conductor line is, as a rule, necessary. In this respect, the arrangement is not different from other measuring devices with selectable measuring range.

The assembly illustrated in Figs. 3a, 3b, 3c and 3d comprises two thermo-converters 30 (Fig. 3b) and 30' (Fig. 3c), the heating wires 9 and 9' and the thermo-couples 10 and 10' of which are rated for different measuring ranges. The transformer (Fig. 3a) is provided with a plug 20 having contact pins 25 and 26 fitting the contact sleeves 5 and 6 or 5' and 6', so that the transformer may be coupled with either converter. The measuring instrument A (Fig. 3d) is connected by wires 17 to a plug 40 having pins 34 and 35 which fit the sockets 14 and 15 or 14' and 15' of the converters 30 and 30' respectively, so that the instrument may also be used with either converter. The spacing between sockets 5 and 6 (5' and 6') is different from that between sockets 14 and 15 (14' and 15') to prevent misconnections.

The transformer may also be connected to the thermo-converters in other ways than abovementioned, for instance, in such a manner that the selecting connection is effected by a switching device. An example of the latter kind is shown in Fig. 4. The transformer is provided with a switch 18 allowing to selectively connect one of two differently rated thermo-converters designated by 9, 10, 11 and 9', 10', 11' respectively. A direct current ammeter A is connected to the thermo-wires 10, 11 and 10', 11' of both converters. Different measuring ranges are adjusted by changing the switch position or the number of turns of the high frequency lead 16.

I claim as my invention:

1. An arrangement for measuring high-frequency currents, comprising an annular magnet core having a bore for inserting a conductor carrying the high-frequency current to be measured, a secondary winding on said magnet core, at least two thermo-converters each comprising a heating wire and a thermo-couple connected to said heating wire, means for selectively connecting said secondary winding to one of said heating wires, a direct current instrument, and means for connecting said instrument to said thermo-couples.

2. An arrangement for measuring high-frequency currents, comprising an annular magnet core having a bore for inserting a conductor carrying the high-frequency current to be measured, a secondary winding on said core, an insulating case enclosing said winding, detachable coupling elements secured to said case and connected to the ends of said secondary winding, at least two thermo-converters each comprising a heating wire, a thermo-couple connected to said heating wire, and coupling elements connected to the ends of said heating wire and fitting the aforesaid coupling elements connected to said secondary winding, a direct current instrument and means for selectively connecting said instrument with said thermo-couples.

3. An arrangement for measuring high-frequency currents, comprising an annular magnet core having a bore for inserting a conductor carrying the high-frequency current to be measured, a secondary winding on said core, an insulating case enclosing said winding, detachable coupling elements secured to said case and connected to the ends of said secondary winding, at least two thermo-converters each having an insulating casing, a heating wire, a thermo-couple connected to said heating wire, and coupling elements connected to the ends of said heating wire and arranged on said casing so as to fit the first-mentioned coupling elements, a direct current instrument and a detachable coupling secured to said thermo-couple and said direct current instrument for selectively connecting said instrument with one or another of said converters, said latter coupling being different from the aforesaid coupling elements so as to prevent misconnections.

4. An arrangement for measuring high-frequency currents, comprising an annular magnet core having a bore for inserting a conductor carrying the high-frequency current to be measured, a secondary winding on said core, an insulating case enclosing said winding, two spaced contact pins secured to said case and connected to the ends of said winding, in selective combination with at least two thermo-converters each having an insulating enclosure, a heating wire, a thermo-couple connected to said heating wire, two contact sockets secured to said enclosure and fitting said contact pins, and two other contact sockets connected to said thermo-couple and also secured to said enclosure, said latter contact sockets having their spacing distance different from that of the aforementioned contact sockets, in combination with a direct current instrument and contact pins connnected with said instrument and fitting the contact sockets secured to said converter enclosure.

5. An arrangement for measuring high-frequency currents, comprising an annular magnet core having a bore for inserting a conductor carrying the high-frequency current to be measured, two secondary windings connected in parallel and each being wound on one-half of said core, at least two thermo-converters each comprising a heating wire and a thermo-couple connected to said heating wire, means for selectively supplying the high-frequency current to be measured to one of said heating wires, means for selectively connecting said secondary windings to one of said heating wires, a direct current instrument, and means for selectively connecting said instrument to said thermo-couples.

JOSEF STANEK.